United States Patent Office 2,730,526
Patented Jan. 10, 1956

2,730,526

PREPARATION OF 2-BENZOTHIAZOLYL SULFENE MORPHOLIDE

Robert C. Kinstler, Dunellen, N. J., assignor to American Cyanamid Company, New York, N. Y., a corporation of Maine No Drawing. Application May 21, 1951,
Serial No. 227,510

3 Claims. (Cl. 260—247.1)

This invention relates to the preparation of a rubber accelerator of the sulfenamide type. More particularly, it is concerned with the preparation of 2-benzothiazolyl sulfene morpholide.

In recent years accelerators of this type have acquired great importance. However, the available methods for their preparation are not completely satisfactory. The main objection to the present methods for making these products is that they can neither be obtained in high yield or purity.

One existing method for the preparation of accelerators of the sulfenamide type consists in the condensation of N-chloroamines with sodium 2-mercaptobenzothiazole under alkaline conditions. However when this reaction is applied to the preparation of 2-benzothiazolyl sulfene morpholide, the product is contaminated with various by-products. One of the more important of these is 2,2'-dibenzothiazolyl disulfide which is formed by the oxidation of the 2-mercaptobenzothiazole. This reaction also produces other impurities which are highly colored and of obscure chemical nature. These impurities cannot be removed and, accordingly, result in a product of objectionable discoloration.

Various attempts have been made to eliminate the formation of these by-products. One of the methods employed is the conduction of the reaction in an anhydrous organic solvent. This, however, leads to entirely different practical difficulties which are equally as serious. One of the problems involved is the difficulty in preparing an anhydrous dispersion of sodium 2-mercaptobenzothiazole in an organic solvent. Such a dispersion is very difficult to stir properly and, as a result, is almost impossible to dehydrate thoroughly. To a certain extent this has been overcome by using very large quantities of solvent. However, the excessive reaction volumes thus formed render the procedure commercially impractical. A further difficulty in this procedure is the fact that the condensation reaction between sodium 2-mercaptobenzothiazole and the N-chloroamine is exceedingly slow under these conditions. Consequently, the use of anhydrous conditions has not offered any advantages in this reaction.

It is therefore a primary object of this invention to provide a method for the preparation of 2-benzothiazolyl sulfene morpholide. It is a further object of this invention to provide a method of preparing 2-benzothiazolyl sulfene morpholide in which the product is obtained in high yield and is of high purity. It is a further object of this invention to provide a method which is free of the disadvantages found in the previous methods of producing this product.

As in the previous processes, the present method consists in the preparation of 2-benzothiazolyl sulfene morpholide by the condensation of N-chloromorpholine in an inert organic solvent. The objects of this invention have been met, however, by carrying out the condensation with the free 2-mercaptobenzothiazole rather than with sodium 2-mercaptobenzothiazole. Surprisingly, the use of the free 2-mercaptobenzothiazole almost completely suppresses the formation of by-products with the result that the desired product is obtained in a high state of purity and in a substantially theoretical yield.

The present invention has a further decided advantage over the previous methods of producing the product. This lies in the fact that the free 2-mercaptobenzothiazole employed in this procedure is a readily available commercial material, while the sodium salt thereof employed in previous methods must be especially prepared. Furthermore, the behavior of the free mercaptan shows none of the objectionable disadvantages characteristic of the sodium salt when dispersed in an organic solvent.

The present invention is particularly advantageous in that it requires no special apparatus. Accordingly, any suitable apparatus may be employed to conduct the process. Furthermore, there are no critical conditions that must be maintained. As a result, the process may be conducted with a minimum of supervision.

It has been found necessary in this procedure to add an acceptor for the hydrogen chloride evolved during the reaction. Numerous materials may be used for this purpose. Among these are soda ash and potash. Amines, however, particularly tertiary amines, are more efficient. Among those which may be employed are triethylamine, N-ethylmorpholine, dimethylbenzylamine, tributylamine, pyridine, N-methylpiperidine and the like. Morpholine itself is a particularly convenient amine to use.

The N-chloromorpholine employed in the process may be prepared in any desired manner. For instance, it may be prepared by chlorinating morpholine in situ in the same solvent to be used in the condensation reaction. Regardless of the method of chlorinating the morpholine, equivalent quantities of N-chloromorpholine and 2-mercaptobenzothiazole together with the hydrogen chloride acceptor are brought together in an inert organic solvent.

The choice of solvent employed is limited only by the requirement of inertness to the reactants under the rather mild reaction conditions. Suitable solvents include, for example, the chlorinated aliphatic hydrocarbons such as carbon tetrachloride and trichloroethylene, benzene and its homologues and their halogenated derivatives, thiophene, nitrobenzene and the like. The hydrocarbons of the benzene series, including specifically benzene, toluene, and the xylenes, have been found to be particularly suitable solvents. The use of the hydrocarbons of the benzene series, just mentioned, constitutes a preferred embodiment of this invention.

The condensation reaction is found to proceed very readily with mild heating if desired. The alkali metal chloride or hydrochloride of the acceptor amine formed as a reaction by-product is readily filtered off. The 2-benzothiazolyl sulfene morpholide remains in solution and may be recovered by evaporation or steam distillation of the solvent.

The acceptor amine may be conveniently recovered from its hydrochloride in a form readily reusable. This is accomplished by slurrying the hydrochloride in an inert solvent and passing ammonia into the mixture. Rapid neutralization takes place with liberation of the amine and formation of ammonium chloride. The latter may be readily removed by filtration leaving the amine in pure form in solution. This solution may be directly chlorinated and recycled for further use.

The invention will be further illustrated by the following examples. These examples, however, are in no way intended to limit the invention. All parts are by weight unless otherwise specified.

*Example 1*

A solution of 208 parts of morpholine in 1130 parts of toluene is stirred and treated with gaseous chlorine at a temperature below 50° C. The resulting solution of N-chloromorpholine is filtered to remove the morpholine hydrochloride formed as a by-product in the chlorination, and treated with an additional 104 parts of morpholine.

To the resulting solution is added 204 parts of 2-mercaptobenzothiazole. The mixture is at first cooled to keep the temperature at 50° C., then heated to 70° C. and stirred at this temperature for one hour. The morpholine hydrochloride is filtered from the mixture and the solvent removed by distillation. The product is a cream-colored solid and is obtained in substantially quantitative yield.

The filtered morpholine hydrochloride is slurried in about 800 parts of dry benzene. The mixture is stirred at 20–25° C. while dry ammonia gas is bubbled into it. The voluminous fluffy solid gradually becomes granular and is then filtered off. The morpholine is recovered in high yield and purity in the benzene solution and can be chlorinated directly for the preparation of another batch of the sulfenamide.

*Example 2*

The procedure of this example is substantially the same as that followed in Example 1. However, the sodium salt of 2-mercaptobenzothiazole is employed in place of the free mercaptan. A yield of approximately 75% is obtained. This is substantially less than the yield obtained in Example 1 when employing the free mercaptan. Moreover, the quality of the product is inferior to that obtained in Example 1.

*Example 3*

To a solution of 121 parts of N-chloromorpholine in 1350 parts of toluene is added 87 parts of pyridine, followed by 167 parts of 2-mercaptobenzothiazole with stirring and cooling. The mixture is heated to 30–40° C. the reaction being complete after about 12 hours. The solid pyridine hydrochloride is filtered off and the toluene evaporated. A good yield of product is obtained.

I claim:

1. A process of preparing 2-benzothiazolyl sulfene morpholide of high purity from free 2-mercaptobenzothiazole and N-chloromorpholine wherein free 2-mercaptobenzothiazole is reacted directly with N-chloromorpholine in an anhydrous, inert, volatile organic solvent to form 2-benzothiazolyl sulfene morpholide and by-product hydrogen chloride without forming any substantial amount of 2-benzothiazolyl disulfide, which comprises the steps of: preparing an anhydrous solution of N-chloromorpholine and morpholine in an inert, volatile, organic solvent, said morpholine compounds being in substantially equimolecular amounts; mixing 2-mercaptobenzothiazole with said solution in amount sufficient to react with the N-chloromorpholine and convert the same into 2-benzothiazolyl sulfene morpholide; maintaining the mixture at reaction temperature until the reaction is substantially complete and by-product hydrogen chloride is fixed by the morpholine and converted into insoluble morpholine hydrochloride; and recovering 2-benzothiazolyl sulfene morpholide from the reaction mixture.

2. The process of claim 1 wherein said inert, volatile organic solvent is an aromatic hydrocarbon of the benzene series.

3. A process of preparing 2-benzothiazolyl sulfene morpholide of high purity from free 2-mercaptobenzothiazole and N-chloromorpholine wherein free 2-mercaptobenzothiazole is directly reacted with N-chloromorpholine in an anhydrous, inert, volatile organic solvent to form 2-benzothiazolyl sulfene morpholide and by-product hydrogen chloride without forming any substantial amount of 2-benzothiazolyl disulfide, which comprises the steps of: dissolving morpholine in toluene to form an anhydrous solution thereof; chlorinating said anhydrous solution to form equimolecular amounts of N-chloromorpholine and by-product morpholine hydrochloride; filtering off the insoluble morpholine hydrochloride; adding morpholine to the filtrate in such amount as to produce an anhydrous solution containing substantially equimolecular amounts of N-chloromorpholine and morpholine; mixing free 2-mercaptobenzothiazole with said solution in an amount sufficient to react with the N-chloromorpholine and convert the same to 2-benzothiazolyl sulfene morpholide; maintaining the mixture at reaction temperature until the reaction is substantially complete and by-product hydrogen chloride is fixed by the morpholine and converted into insoluble morpholine hydrochloride; separating insoluble morpholine hydrochloride by filtration; and recovering 2-benzothiazolyl sulfene morpholide from the filtrate by distilling off the toluene.

References Cited in the file of this patent

UNITED STATES PATENTS

| | | |
|---|---|---|
| 2,045,888 | Tschunker | June 30, 1936 |
| 2,271,834 | Carr | Feb. 3, 1942 |

FOREIGN PATENTS

| | | |
|---|---|---|
| 586,351 | Germany | 1933 |